US007036350B2

(12) United States Patent
Dommer et al.

(10) Patent No.: US 7,036,350 B2
(45) Date of Patent: May 2, 2006

(54) ARRANGEMENT FOR PRODUCTION OF CUT OUT AND/OR UNFORMED WORKPIECES

(75) Inventors: Hans-Martin Dommer, Goeppingen (DE); Helmut Elsaesser, Goeppingen (DE); Gerhard Pick, Waeschenbeuren (DE); Wolfgang Muehlhaeuser, Rechberghausen (DE); Joerg Voegele, Goeppingen (DE)

(73) Assignee: Schuler Pressen GmbH & Co., Goeppingen (DE)

( * ) Notice: Subject to any disclaimer, the term of this patent is extended or adjusted under 35 U.S.C. 154(b) by 148 days.

(21) Appl. No.: 10/653,915

(22) Filed: Sep. 4, 2003

(65) Prior Publication Data

US 2004/0111851 A1    Jun. 17, 2004

(30) Foreign Application Priority Data

Sep. 4, 2002   (DE) ................. 102 41 312
Sep. 20, 2002  (DE) ................. 102 43 702

(51) Int. Cl.
  *B21D 43/10*   (2006.01)
(52) U.S. Cl. .................... 72/422; 72/17.3; 72/324; 72/405.09; 72/405.12; 100/207; 29/598

(58) Field of Classification Search .............. 72/129, 72/131, 324, 363, 379.2, 405.09, 405.12, 72/405.13, 422, 17.3, 19.5; 198/620, 621.1, 198/346.1; 483/14, 15; 100/207; 29/563, 29/564, 598, 609
See application file for complete search history.

(56) References Cited

U.S. PATENT DOCUMENTS

| 4,998,430 | A  | * | 3/1991  | Howe ........................ 72/335   |
| 5,005,281 | A  | * | 4/1991  | Burns ........................ 29/596   |
| 5,168,218 | A  | * | 12/1992 | Rich ......................... 324/758  |
| 6,176,365 | B1 | * | 1/2001  | Klemm ..................... 198/621.1   |
| 6,213,282 | B1 | * | 4/2001  | Mokler et al. ............. 198/415     |
| 6,664,667 | B1 | * | 12/2003 | Mayer et al. .............. 310/12      |
| 6,665,588 | B1 | * | 12/2003 | Watanabe et al. .......... 700/259      |
| 6,666,063 | B1 | * | 12/2003 | Pick et al. ................. 72/131    |
| 6,742,457 | B1 | * | 6/2004  | Shiroza ..................... 101/485   |

* cited by examiner

Primary Examiner—Ed Tolan
(74) Attorney, Agent, or Firm—Crowell & Moring LLP

(57) ABSTRACT

A device for producing cut-out and/or shaped workpieces, especially for producing rotors and stators of a generator or electric motor, with at least one cutting device and/or at least one shaping device, at least one gripping device for picking up and setting down raw material and/or finished workpieces and at least one transfer device, at which at least one gripping device can travel and be driven.

12 Claims, 5 Drawing Sheets

ARRANGEMENT FOR PRODUCTION OF CUT OUT AND/OR UNFORMED WORKPIECES

This application claims the priority of German Patent Application No. 102 41 312.6, filed Sep. 4, 2002, and German Patent Application No. 102 43 702.5, filed Sep. 20, 2002, the disclosures of which are expressly incorporated by reference herein.

BACKGROUND OF THE INVENTION

The present invention relates to a device for producing cut-out and/or shaped workpieces, especially for producing rotors and stators of a generator or electric motor, with at least one cutting device and/or at least one shaping device, at least one gripping device for picking up and setting down raw material and/or finished workpieces and at least one transfer device, at which at least one gripping device can travel.

As is generally known, a relatively high technical effort is required for the driving mechanism of the gripping devices, which can travel at transfer device. For example, for the traveling motion of the gripping devices along the transfer device, cogged belts, toothed racks, sprocket wheels, slip-on gear mechanisms, couplings, clutches, pullies and other components, necessary for the driving mechanism, are required. However, these components are always subject to some wear, which, in the course of time, can lead to sudden operational breakdowns. In addition, these components, especially the gear wheels of the gear mechanisms, must be decelerated and accelerated once again for each change in the direction of motion; this leads to unavoidable losses in time and energy.

SUMMARY OF THE INVENTION

An object of the present invention is to greatly reduce in a device of the aforementioned type that the technical effort for the driving mechanism of the gripping devices.

In accordance with the present invention, this object has been accomplished by a device for producing cut-out and/or shaped workpieces, especially for producing rotors and stators of a generator or electric motor, with at least one cutting and/or shaping device, at least one gripping device for picking up and setting down raw material and/or finished workpieces and at least one transfer device, at which the at least one gripping device can travel, the inventive device being characterized in that the at least one gripping device can be driven by at least one linear motor.

Through the use of linear motors for driving the gripping device, driving mechanism components, such as cogged belts, toothed racks, sprocket wheels, slip-on gear mechanisms, couplings, clutches, pullies and the like, which have previously been required, can now be advantageously omitted. Consequently, the total, mechanical construction of the driving mechanism for the gripping device can be configured with great simplicity. As a result of the very simple construction of the driving mechanism for the gripping device, movements with the highest dynamics are also now possible so that sudden changes in the direction of motion can be realized within very short times and with minimum losses of energy because the components whose masses had to be decelerated and accelerated in conventional equipment can now be omitted.

Moreover, the device of the present invention is extremely reliable operationally because the components, which previously were susceptible to breakdowns, have now been entirely omitted. Due to the simplified mechanical construction, which results from the use of linear motors, the device can have manifold variations in the arrangement of the individual stations that are required for producing the workpieces. Accordingly, the device of the present invention is adaptable flexibly and simply to certain planning specifications, for example, with respect to the site of the construction or the material flow.

So that the at least one gripping device can travel to any point in space that is desired, at least one linear motor is provided for each vector spanning the space. The device according to the present invention can be operated particularly rapidly and in a timesaving manner if the stators and rotors or stators of different dimensions are produced simultaneously.

For reasons of a flexible and rational manufacturing process, the device may have at least one stacking device for stacking raw materials and finished workpieces and for removing these from the stacks. It is also contemplated for the at least one stacking device to take up several stacks simultaneously. In order to avoid an eccentric processing of the raw material blanks, the one or more stacking devices can be equipped with a centering device for centering the stack.

So that stacking and removal from the stack can proceed without breakdowns and automatically during the manufacturing process, the centering device can be provided with a camera. Due to the use of the camera for centering the stack, the operating personnel no longer have to adjust the centering device. The camera has to be parameterized only once by the manufacturer of the device. It can then monitor the stacking process automatically. It is particularly advantageous if the camera has a device for recognizing the coordinates of an axle hole which is located in the raw material and/or the finished workpiece for the purpose of accommodating a rotor axle.

Advantageously, the at least one cutting and/or shaping device may be a laser cutting device or a groove-stamping press.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
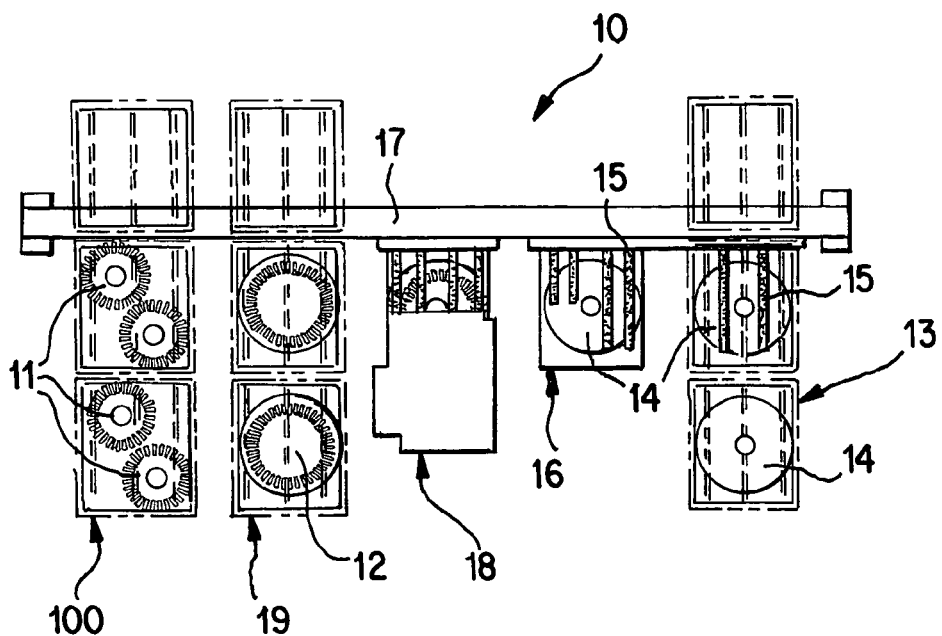
FIG. 1 is a schematic diagram showing a first embodiment of the device according to the present invention.

FIG. 1 shows a device 10 for producing rotors 11 and stators 12. The device 10 has a tray 13, on which raw material blanks 14 are deposited. The raw material blanks on the tray 13 are made available for the further manufacturing process. A known type of camera, the details of which are not shown here, recognizes the center of raw material blanks 14 and makes possible the pre-centered picking up of the top raw material blank 14. The camera recognizes when the position of the top blank deviates from a permissible tolerance so that the process of stacking the individual metal sheets is stopped. Accordingly, the eccentric processing of the raw materials blanks 14 in the plant is prevented due to the use of the camera and consequently undesirable collisions and damage can be avoided. Because a camera is used to pre-center the stack, the operating personnel no longer has to set up the centering device. The camera has to be parameterized only once by the manufacturer of the device 10. It can than monitor the stacking process automatically.

In the next step of the manufacturing process, a gripper 15 picks up a raw material blank 14 from the tray 13 and passes it on to a device 16, in which it is centered and oriented for the further manufacturing process. At the same time, the gripping device 15 moves along a transfer device 17. Subsequently, the gripping device 15 picks up the centered and oriented raw material blank 14 and passes it on to a cutting device 18 which can be a groove-stamping press or a laser cutting device. In the cutting device 18, the stator 12 is grooved and a rotor preform is cut out of the raw material blank 14.

In the next step, the stator 12 is placed on a tray device 19 and the rotor preform is placed on a tray device 100. The device 10 is also suitable for manufacturing rotors exclusively. In that case, the rotor preforms, which are deposited on the tray device 19 preferably on pallets, are brought into the tray device 13 before the start of the manufacturing process. The tray device 13 and the device 16 retain their above-described function. Only the rotor 11 is then grooved and subsequently placed on tray device 19 in the cutting device 18. That is, the tray 100 is not required where rotors exclusively are being made.

Figure 2:
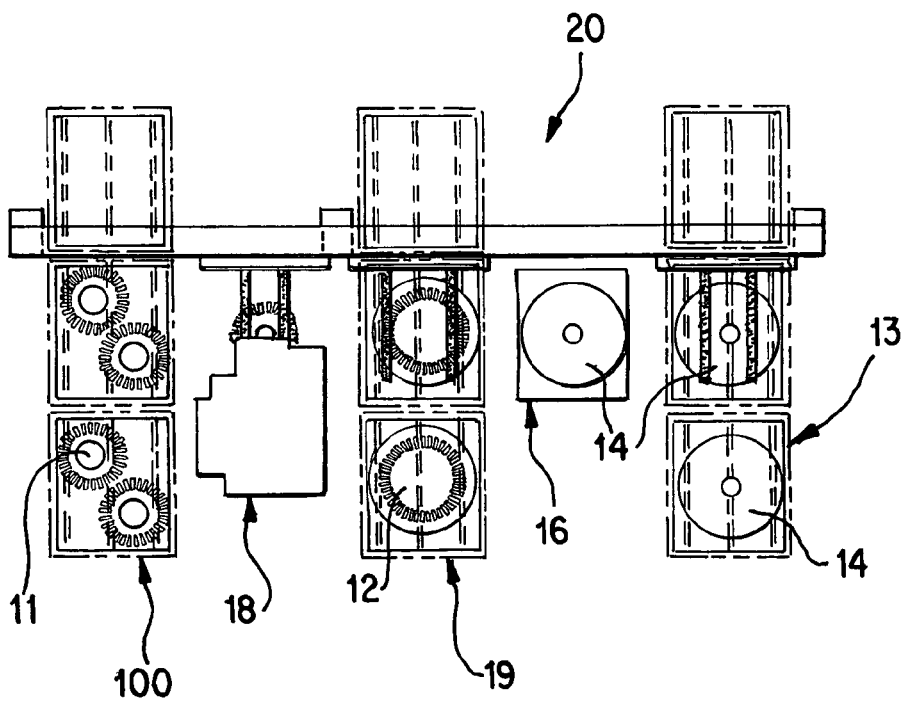
FIG. 2 is a schematic diagram showing a second embodiment of the device.

FIG. 2 shows a device 20 for producing rotors 11 and stators 12. The device 20 has the devices 13, 16, 18, 19 and 100 that have already been described above. They are, however, arranged differently in this second embodiment than in the device 10. This different arrangement, as well as the variety of arrangements shown in the other figures, are possible due to the use of linear motors for driving the gripping devices 15. Moreover, only the arrangement of the different devices need be changed, other structural changes not being required. With the device 20, the rotors 11 and stators 12 can also be manufactured from the raw material blank 14 in the manner described above.

Figure 3:
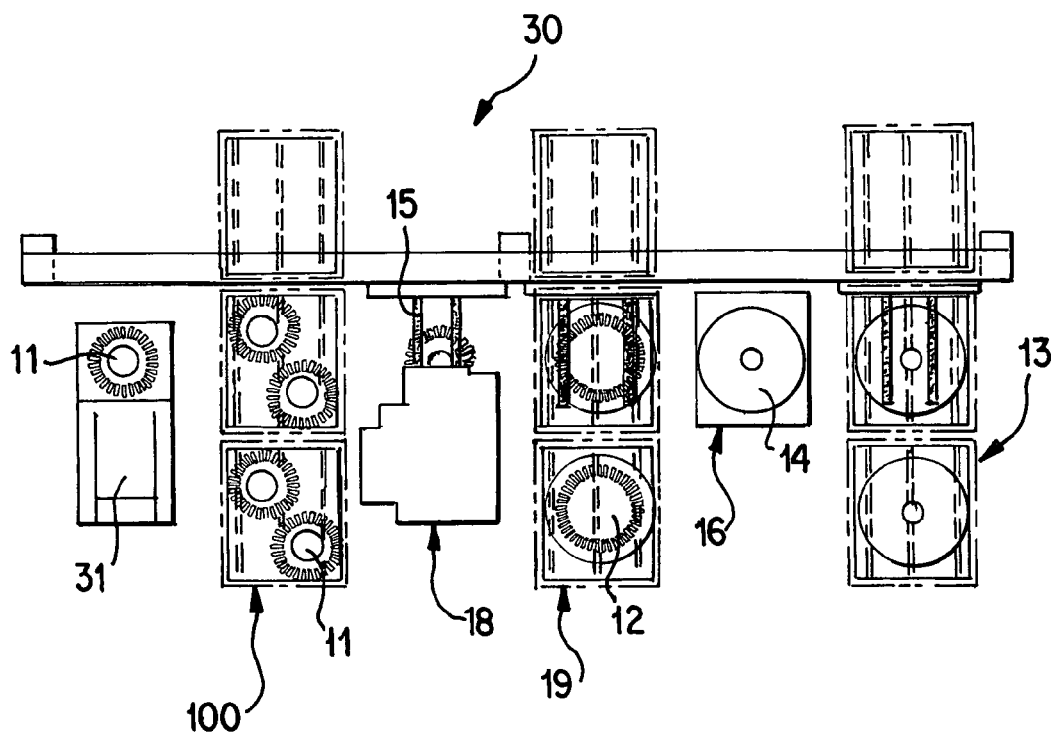
FIG. 3 is a schematic diagram showing a third embodiment of the device.

FIG. 3 shows a device 30 for producing rotors 11 and stators 12. The device 30 also has the devices 13, 16, 18, 19 and 100 that have already been described above and the arrangement of which corresponds to the arrangement of the device 20 which has already been described with reference to FIG. 2. In addition, however, the device 30 has a cutting device 31 which cuts out the axle hole which is provided in the rotor 11. Accordingly, the centered and orientated raw material blank 14 is supplied by the device 16 to the cutting device 18. In the cutting device 18, the stator 12 is grooved and the rotor preform is cut out. Subsequently, the stator 12 is delivered by the cutting device 18 to the tray 19 and the cut-out rotor preform is grooved in the cutting device 18. After that, the finished rotor 11 is supplied by the gripping device 15 to the cutting device 31, in which the axle hole of the rotor 11 is cut out. The finished rotors 11, which come out of the cutting device 31, are stacked on the tray 100.

Figure 4:
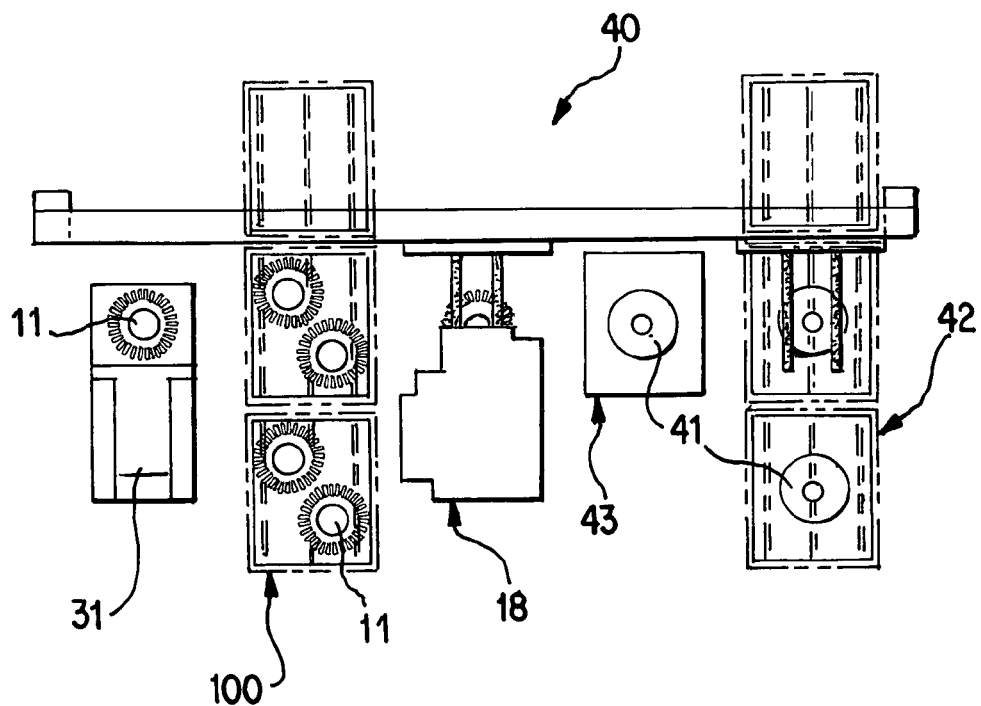
FIG. 4 is a schematic diagram showing a fourth embodiment of the device.

FIG. 4 shows a device 40 for producing cut-out rotors 11. For producing rotors 11, the rotor preforms 41 are stacked on a tray 42, on which they can be pre-centered as described with respect to FIG. 1. Subsequently, they are supplied to a device 43 for centering and orienting. From the device 43, the rotor preforms 41 reach the cutting device 18, in which the rotors 11 are grooved. From the cutting device 18, the grooved rotors 11 are transferred to the cutting device 31 to cut out the axle hole of the rotors 11. The rotors 11, coming from the cutting device 31, reach the tray 100, where they are stacked on top of one another.

Figure 5:
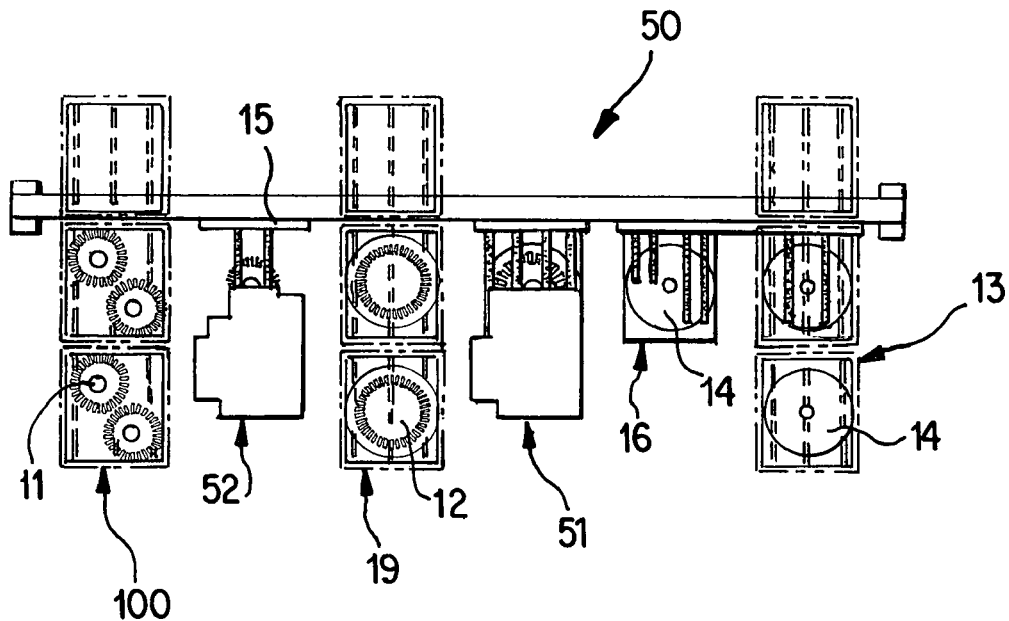
FIG. 5 is a schematic diagram showing a fifth embodiment of the device.

FIG. 5 shows a device 50 for producing rotors 11 and stators 12. From the devices 13 and 16, which have already been described above, the centered and oriented raw material blank 14 reaches a cutting device 51, in which the stator 12 is grooved and the rotor preform is cut out. Subsequently, the finished stator 12 is removed from the cutting device 51 and passed on to the tray 19. From the cutting device 51, the rotor preform is supplied by the gripper device 15 to a cutting device 52, in which the rotor 11 is grooved. Thereafter, the rotor 11 is removed from the cutting device 52 and transferred to the tray 100, on which the finished rotors 11 are stacked.

Figure 6:
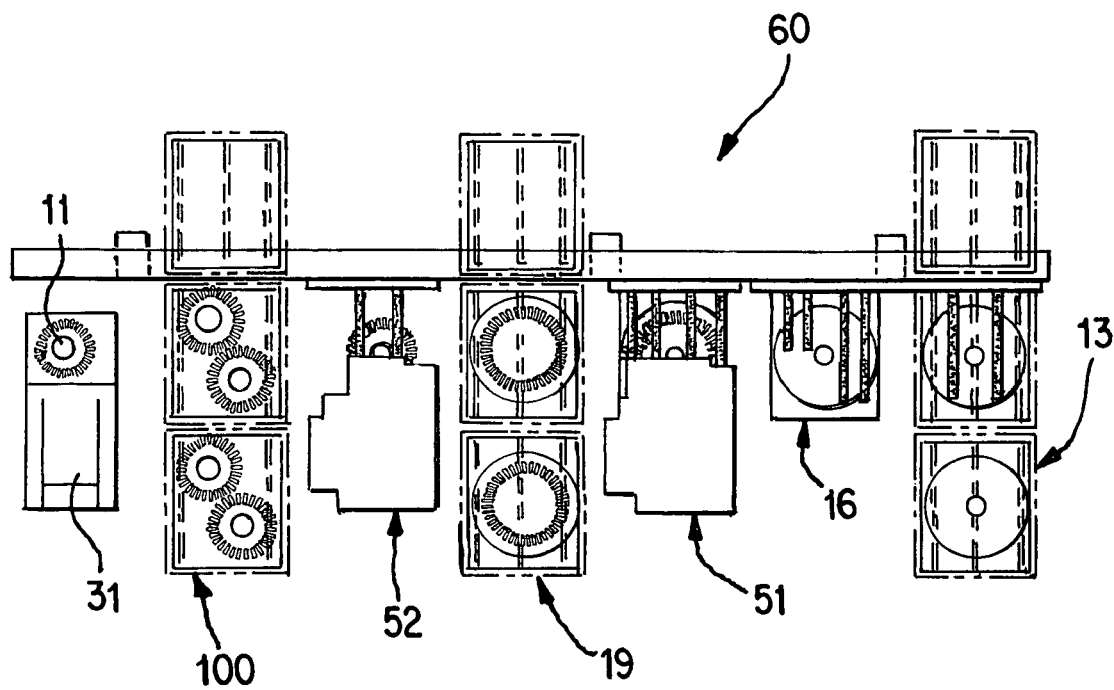
FIG. 6 is a schematic diagram showing a sixth embodiment of the device.

FIG. 6 shows a device 60 which, with respect to the devices 13, 16, 31, 51, 52 and 100, corresponds to the device 50 (FIG. 5). In addition, however, the device 60 has the cutting device 31 to cut out the axle hole of the rotors 11 which have already been grooved. Subsequently, the finished grooved rotors 11 reach the cutting device 31 from the cutting device 52. When the axle hole has been cut out, the rotor 11 reaches the tray 100, on which the finished rotors 11 are stacked.

Figure 7:
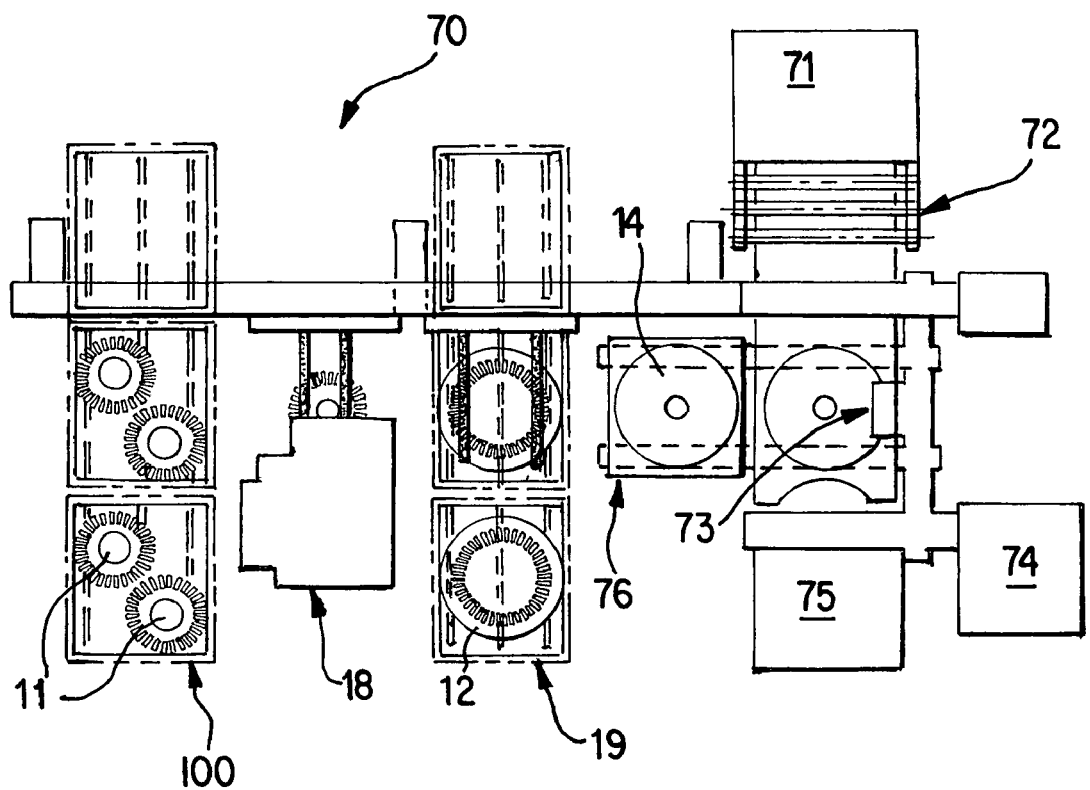
FIG. 7 is a schematic diagram showing a seventh embodiment of the device.

FIG. 7 shows a device 70 for producing rotor metal sheets 11 and stator metal sheets 12. The strip material is wound onto a reel 71, from which it is passed through a feeding and aligning machine 72 and, from there, to a laser cutting device 73, which is supplied by a laser generator 74. In the laser cutting device 73, a raw material blank 14 is cut out in an operation to produce its external and internal contour, venting holes and the like. Cut-out sheet-metal waste, originating from the laser cutting, is collected in a waste container 75. From the laser cutting device 73, the raw material blank 14 reaches the cutting device 18, in which the stator 12 is grooved and the rotor perform is cut out. From the cutting device 18, the grooved stator 12 reaches the tray 19, on which the finished stators 12 are stacked. When the stator 12 has been removed from the cutting device 18, the rotor 11 is grooved and subsequently conveyed to the tray 100, on which the finished rotors 11 are stacked. Alternatively, with the device 70, the laser cutting of the rotors 11 and/or the stator 12 can be completed in the laser cutting device 73. In that case, the cutting device 18 can be omitted. The finished rotors 11 are stacked on the tray 100 and the finished stators 12 on the tray 19.

Figure 8:
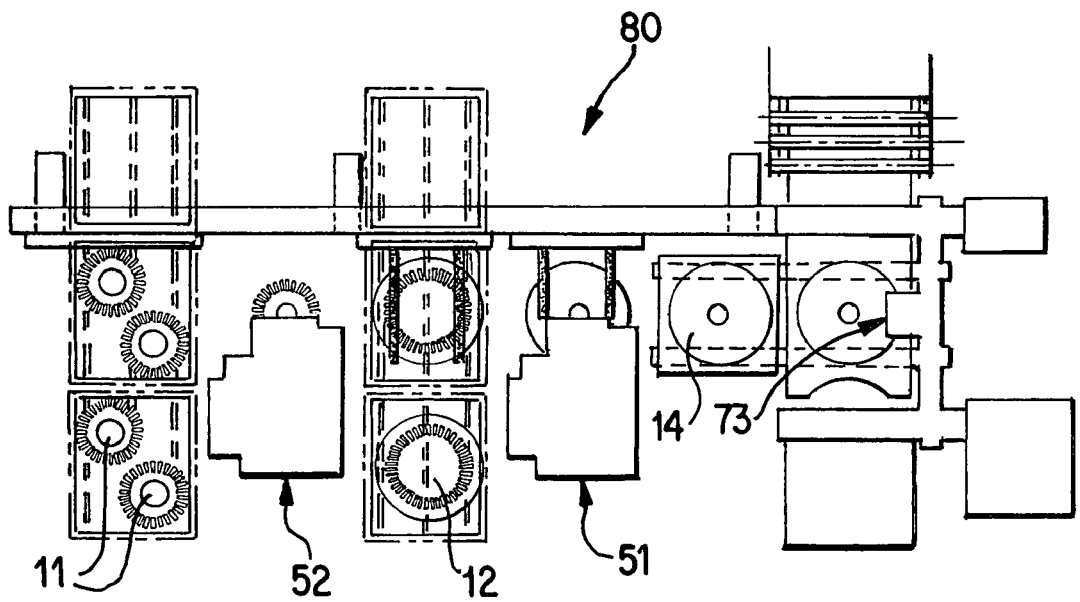
FIG. 8 is a schematic diagram showing an eighth embodiment of the device.

FIG. 8 shows a device 80 for producing rotors 11 and stators 12. The strip material, coming from the reel, is converted with the laser cutting device 73 into the material preform 14. The material preform 14 is also provided by the laser-cutting device 73 with a prefabricated axle hole for the rotor 11 which is to be produced. The stators 12 are grooved with the cutting device 51, and the rotors 11 are grooved with the cutting device 52. Moreover, the axle hole of the rotors 40 is also cut out with the cutting device 51. As in the case of the device 70 shown in FIG. 7, the rotor 11 and the stator 12 can also be cut out by a laser in the case of the device 80 with the laser cutting device 73. In that case, the cutting devices 51 and 52 may be omitted.

Figure 9:
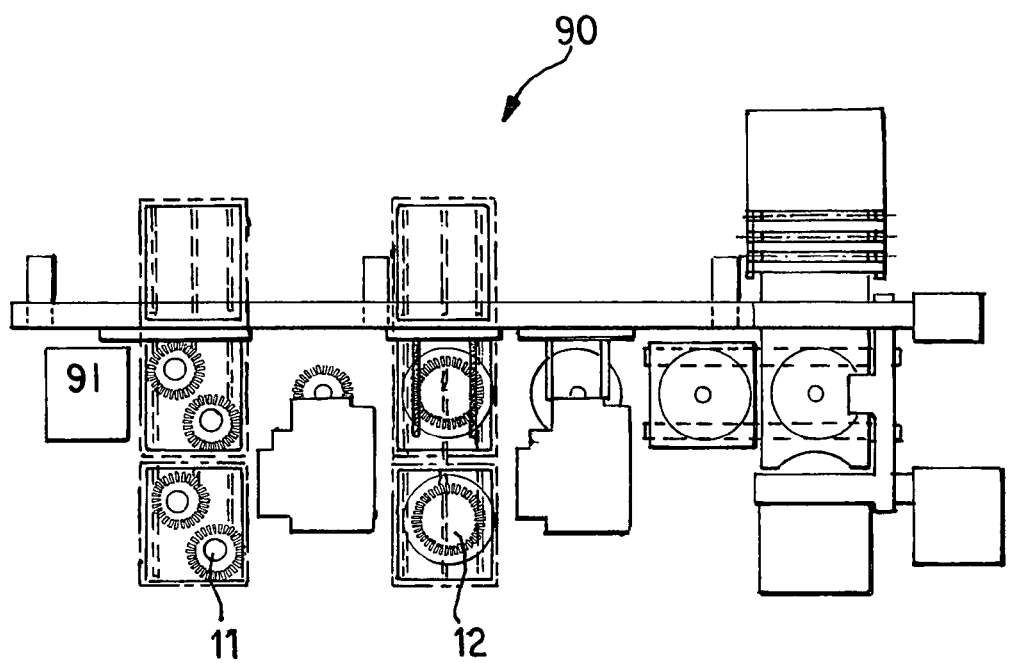
FIG. 9 is a schematic diagram showing a ninth embodiment of the device.

FIG. 9 shows a device 90 for producing the rotors 11 and the stators 12. The device 90 substantially corresponds to the device 80, with the exception that it has a waste container 91, in which the waste from the production of the finished axle hole of the rotors 11 is collected.

Figure 10:
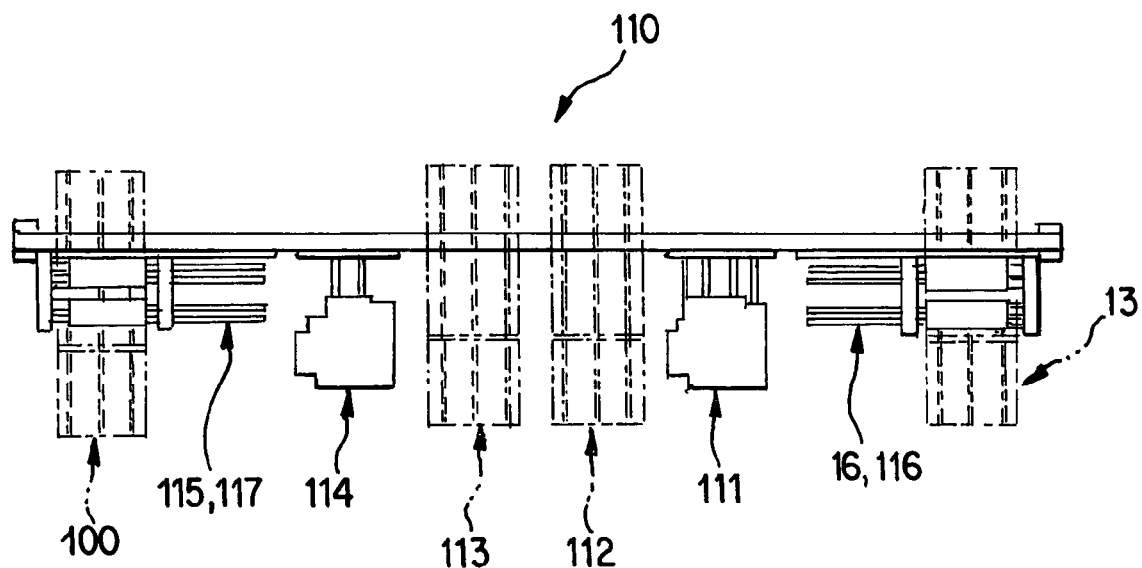
FIG. 10 is a schematic diagram showing a tenth embodiment of the device.

FIG. 10 shows a device 110 for simultaneously producing rotors 11 and stators 12. In addition, it is alternatively also possible to fabricate different rotors simultaneously with the device 110. The device 110 comprises the devices 13, 16 and 100, which have already been described previously with respect to FIG. 1. Moreover, the device 110 comprises cutting devices 111, 114. The stators can be grooved and rotors preforms cut out from raw material blanks with the cutting device 111. Subsequently, the stators are deposited on a tray 112 and the rotor preforms are deposited on an intermediate tray 113. In the next step, the rotor preforms are conveyed from the intermediate tray 113 to the cutting device 114, where the rotor grooves are produced. From the cutting device 114, the grooved rotors reach an intermediate tray 115 and, from there, a tray 100 where the finished rotors are stacked on pallets. For an alternative production of different rotors, the device 110 is used by making ready the raw material for the rotors, which are to be fabricated differently, on pallets in the devices 13, 100. From there, the rotor raw material is conveyed to respective devices 116, 117 for centering and orientation. From the devices 116, 117, the centered and oriented rotor raw material is conveyed to the cutting devices 111, 114 where the different rotors are grooved. From the cutting devices 111, 114, the finished grooved, different rotors reach the devices 112, 113 where they are stacked on pallets.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. Device for producing workpieces that are at least one of punched out and shaped, for producing rotors and/or stators for an electric motor or a generator, comprising at least two independently operated shaping or punching devices, two stacking devices, two preparation devices wherein the shaping or punching devices, the stacking devices and the preparation devices are arranged in a row, and a transfer device on which gripping devices are movably arranged for preparing and removing material to and from the shaping or punching devices, wherein the gripping devices are linear motor driven.

2. The device of claim 1, wherein the gripping devices have at least one linear motor for each vector spanning a space.

3. The device of claim 1, wherein the stators and rotors are fabricatable simultaneously.

4. The device of claim 1, wherein rotors of different dimensions are fabricatable simultaneously.

5. The device of claim 4, wherein the stacking devices are equipped with a centering device to center each stack.

6. The device of claim 5, wherein the centering device has a camera.

7. The device of claim 6, wherein the camera is configured to recognize coordinates of an axle hole located in at least one of raw material and finished workpieces for accommodating a rotor axle.

8. The device of claim 1, wherein the shaping or punching devices are comprised of a laser cutting device.

9. The device of claim 1, wherein the shaping or punching devices are comprised of a groove-stamping press.

10. The device according to claim 3, wherein the gripping devices have at least one linear motor for each vector spanning a space.

11. The device of claim 4, wherein the gripping devices have at least one linear motor for each vector spanning a space.

12. A device for producing at least one of cut-out and shaped workpieces, which include rotors and stators of a generator or electric motor, comprising at least one of one or more cutting devices and one or more shaping devices, at least one gripping device for picking up and setting down at least one of raw material and finished workpieces, and at least one transfer device, at which at least one gripping device is arranged to travel via a linear motor;

comprising at least one stacking device for stacking into a stack and removing the raw material and finished workpieces from the stack;

wherein the at least one stacking device is equipped with a centering device to center the stack;

wherein the centering device has a camera; and wherein the camera is configured to recognize coordinates of an axle hole located in the at least one of the raw material and finished workpieces for accommodating a rotor axle.

* * * * *